(12) United States Patent
Wang et al.

(10) Patent No.: US 11,366,264 B2
(45) Date of Patent: Jun. 21, 2022

(54) BACKLIGHT MODULE, DISPLAY MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Fengping Wang, Beijing (CN); Rui Han, Beijing (CN); Dong Cui, Beijing (CN); Zeyuan Tong, Beijing (CN); Zhipeng Zhang, Beijing (CN); Wenyang Li, Beijing (CN); Yue Zhai, Beijing (CN); Zan Zhang, Beijing (CN); Shouyang Leng, Beijing (CN); Weining Chi, Beijing (CN); Rui Tan, Beijing (CN); Chang Dong, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 53 days.

(21) Appl. No.: 16/961,810

(22) PCT Filed: Sep. 18, 2019

(86) PCT No.: PCT/CN2019/106527
§ 371 (c)(1),
(2) Date: Jul. 13, 2020

(87) PCT Pub. No.: WO2021/051327
PCT Pub. Date: Mar. 25, 2021

(65) Prior Publication Data
US 2021/0405285 A1    Dec. 30, 2021

(51) Int. Cl.
*F21V 8/00* (2006.01)
*G02F 1/1333* (2006.01)
(Continued)

(52) U.S. Cl.
CPC ........... *G02B 6/0055* (2013.01); *G02B 5/003* (2013.01); *G02B 6/0053* (2013.01);
(Continued)

(58) Field of Classification Search
CPC .... G02B 5/003; G02B 6/0055; G02B 6/0065; G02F 1/133314; G02F 1/133317; G02F 1/133615
See application file for complete search history.

(56) References Cited

U.S. PATENT DOCUMENTS 9,004,736 B1 *  4/2015  Srinivas ............... G02B 6/0073
                                                 362/612
9,146,419 B1 *  9/2015  Anandan .............. G02B 6/0036
(Continued)

FOREIGN PATENT DOCUMENTS

CN    204026331 U    12/2014
CN    104503140 A     4/2015
(Continued)

OTHER PUBLICATIONS

Written Opinion for International Application No. PCT/CN2019/106527 dated May 27, 2020.

*Primary Examiner* — Keith G. Delahoussaye
(74) *Attorney, Agent, or Firm* — Thomas | Horstemeyer LLP

(57) ABSTRACT

A backlight module, a display module, and a display device are provided in the present disclosure, which belong to the technical filed field of display devices. A display device includes a light guide plate and a light-shielding member. The light guide plate includes a light exiting surface and a (Continued)

bottom surface that are oppositely arranged, and a light incident surface and a light shielding surface both connected with the light exiting surface and the bottom surface. The light shielding member is disposed on the light shielding surface, where the light-shielding member includes a light reflecting layer and a light absorbing layer, and the light-absorbing layer is located on a side of the light reflecting layer away from the light shielding surface.

18 Claims, 3 Drawing Sheets

(51) Int. Cl.
  *G02B 5/00* (2006.01)
  *G02F 1/13357* (2006.01)
(52) U.S. Cl.
  CPC ......... *G02B 6/0065* (2013.01); *G02B 6/0088* (2013.01); *G02F 1/133314* (2021.01); *G02F 1/133317* (2021.01); *G02F 1/133615* (2013.01)

(56) References Cited

U.S. PATENT DOCUMENTS

| | | |
|---|---|---|
| 10,557,985 B2 | 2/2020 | Chen et al. |
| 2013/0135898 A1* | 5/2013 | Horikawa ............ G02B 6/0091 |
| | | 362/609 |
| 2014/0160720 A1* | 6/2014 | Seuntiens ................ F21V 9/02 |
| | | 362/2 |
| 2016/0187559 A1 | 6/2016 | Li |
| 2018/0231709 A1 | 8/2018 | Chen et al. |

FOREIGN PATENT DOCUMENTS

| | | |
|---|---|---|
| CN | 204462594 U | 7/2015 |
| CN | 205067925 U | 3/2016 |
| CN | 105700241 A | 6/2016 |
| CN | 206848653 U | 1/2018 |
| CN | 206906761 U | 1/2018 |
| EP | 3371648 A1 | 9/2018 |
| JP | H11149817 A | 6/1999 |
| JP | 3222414 B2 | 10/2001 |
| WO | 2017075968 A1 | 5/2017 |

* cited by examiner

BACKLIGHT MODULE, DISPLAY MODULE AND DISPLAY DEVICE

CROSS-REFERENCE TO RELATED APPLICATION

The present application is a § 371 national phase application based on International Application No. PCT/CN2019/106527, filed on Sep. 18, 2019, where the contents of which are incorporated by reference in their entirety herein.

TECHNICAL FIELD

The present disclosure relates to the technical field of display devices and, in particular, to a backlight module, and also relates to a display module and a display device including the backlight module.

BACKGROUND

With the rapid development of electronic products trending towards being light, thin, and miniaturized, almost all portable electronic products use a liquid crystal display (LCD) panel as a display panel, especially in notebook computers, desktop computers, smart TVs, mobile terminals, or personal digital processors, etc. As such, the LCD panel is already an important component in these products. The LCD panel includes a display panel and a backlight module. The backlight module is an indispensable part of the LCD panel and serves as a light source for the display panel.

The backlight module is divided into a side-incident type backlight and a direct-type backlight according to different incident positions of a light source. The side-incident type backlight module has a light source disposed on one side of a light guide plate so that there is no need to configure a light emitting diode (LED) module behind the display panel, but rather on the side of the display panel, thereby the overall thickness of a display screen can be reduced, making the display device relatively thin.

However, as a border of the display module becomes narrower and narrower, the arrangement of the side-incident type guide plate may cause a problem of bright lines with a large viewing angle in the existing display device.

It should be noted that the information disclosed in the above background section is only for enhancing the understanding of the background of the present disclosure, and therefore may include information that does not constitute prior art known to those of ordinary skill in the art.

SUMMARY

According to a first aspect of the present disclosure, a backlight module is provided. The backlight module includes:

a light guide plate including a light exiting surface and a bottom surface that are oppositely arranged, and a light incident surface and a light shielding surface both connected with the light exiting surface and the bottom surface; and a light shielding member disposed on the light shielding surface, the light-shielding member includes a light reflecting layer and a light absorbing layer, and the light-absorbing layer is located on a side of the light reflecting layer away from the light shielding surface.

According to an exemplary embodiment of the present disclosure, the backlight module further includes:

a light source disposed on the light incident surface of the light guide plate;

wherein a color of the light reflecting layer is the same as a color of light rays emitted by the light source, and a color of the light absorbing layer is different from the color of light rays emitted by the light source.

According to an exemplary embodiment of the present disclosure, the color of the light absorbing layer and the color of light rays emitted by the light source are complementary colors.

According to an exemplary embodiment of the present disclosure, the light reflecting layer is formed of a white light reflecting material, and the light absorbing layer is formed of a black light absorbing material.

According to an exemplary embodiment of the present disclosure, a material of the light reflecting layer includes white glue or white optical ink, and a material of the light absorbing layer includes black glue or black optical ink.

According to an exemplary embodiment of the present disclosure, the light shielding member further includes a substrate, wherein the light reflecting layer and the light absorbing layer are disposed on opposite sides of the substrate.

According to an exemplary embodiment of the present disclosure, the light guide plate appears as a rectangular shape, and the light guide plate includes the light exiting surface and the bottom surface disposed opposite to each other, and four side surfaces connected to the light exiting surface and the bottom surface;

wherein at least one of the side surfaces is the light incident surface, and remaining side surfaces are the light shielding surfaces, and the light shielding member is located on at least one of the light shielding surface.

According to an exemplary embodiment of the present disclosure, the backlight module further includes:

a back plate including a bottom plate and a border provided on the bottom plate, the light guide plate is disposed on the bottom plate, the border surrounds the light guide plate, and a notch is disposed on a side of the border away from the bottom plate;

an optical functional film layer disposed on a side of the light guide plate away from the bottom plate, the optical functional layer includes an optical functional layer body and a protrusion portion, one end of the protrusion portion is connected with edge of the optical functional layer body, the other end of the protrusion portion extends toward a position of the border and is located in the notch; and a middle frame disposed on the side of the border away from the bottom plate to fix the optical functional layer.

According to an exemplary embodiment of the present disclosure, an orthographic projection of the optical functional layer body on the bottom plate and an orthographic projection of the middle frame on the bottom plate have an overlapping region, and an orthographic projection of the protrusion portion on the bottom plate and the orthographic projection of the middle frame on the bottom plate have an overlapping region.

According to an exemplary embodiment of the present disclosure, the orthographic projection of the middle frame on the bottom plate completely covers the orthographic projection of the protrusion portion on the bottom plate.

According to an exemplary embodiment of the present disclosure, a length of the protrusion portion in an extending direction thereof is greater than 0.5 mm.

According to an exemplary embodiment of the present disclosure, a plurality of the protrusion portions and a plurality of the notches are provided, and each of the notches corresponds to a protrusion portion respectively.

According to an exemplary embodiment of the present disclosure, the plurality of protrusion portions are distributed in the circumferential direction of the optical functional layer body.

According to a second aspect of the present disclosure, a display module is also provided, the display module includes:

the backlight module mentioned above; and a display panel disposed at a light exiting side of the backlight module.

According to a third aspect of the present disclosure, a display device is provided, the display device includes the display module mentioned above.

It is to be understood that the above general description and the detailed description below are merely exemplary and explanatory, and do not limit the present disclosure.

BRIEF DESCRIPTION OF THE DRAWINGS

The drawings herein are incorporated into and constitute a part of this specification, show embodiments consistent with this disclosure, and are used together with the specification to explain the principles of this disclosure. Understandably, the drawings in the following description are only some embodiments of the present disclosure. For those of ordinary skill in the art, without paying any creative work, other drawings can also be obtained based on these drawings.

DETAILED DESCRIPTION

Figure 1:
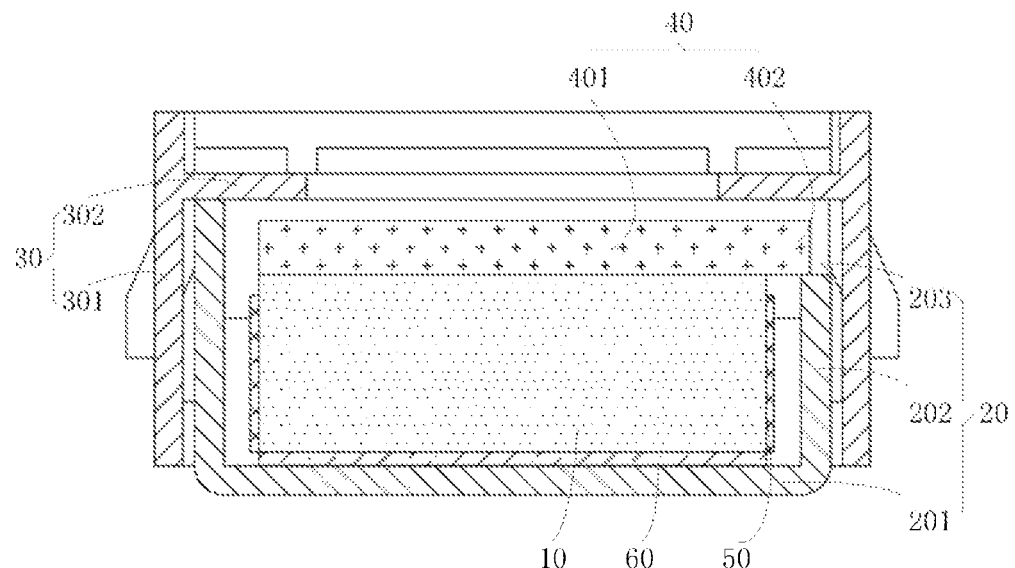
FIG. 1 is a side cross-sectional view of a backlight module provided by an embodiment of the present disclosure.

Exemplary embodiments will now be described more fully with reference to the accompanying drawings. However, the exemplary embodiments can be implemented in various forms and should not be construed as limited to the embodiments set forth herein. Instead, these embodiments are provided so that the disclosure will be thorough and complete, and will fully convey the concept of exemplary embodiments to those skilled in the art. The same reference signs in the drawings denote the same or similar structures, and detailed descriptions thereof will be omitted.

Although relative terms such as "upper" and "lower" are used in the specification of the present disclosure to describe the relationships of one component relative to another component, these terms are used in this specification to be illustrative of the present disclosure, for example, the direction of the example described the accompanying drawings. It will be understood that if the device is upside down, an "upper" component described above will become a "lower" component. When a structure is "on" another structure, it is possible that the structure is integrally formed on another structure, or that the structure is "directly" disposed on another structure, or the structure is "indirectly" disposed on another structure through other structure.

In the present specification, terms "a", "an", "the", "said", and "at least one of" are used to denote the presence of one or more elements, constituent parts, etc. The terms "comprising", "including", and "having" represent open including and refer to additional elements, constituent parts, etc. in addition to the listed elements, constituent parts, etc.

Figure 2:
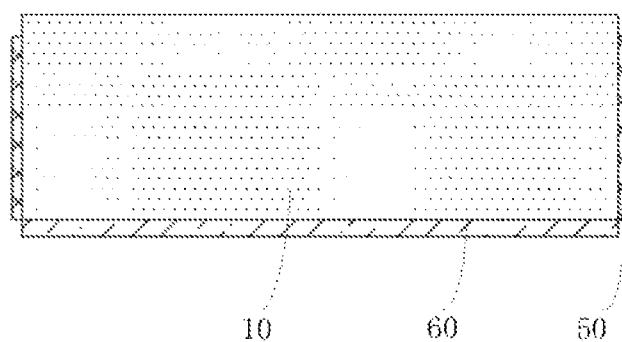
FIG. 2 is a side cross-sectional view of a light guide plate, a light shielding member, and a light reflecting sheet provided by an embodiment of the present disclosure.
Figure 3:
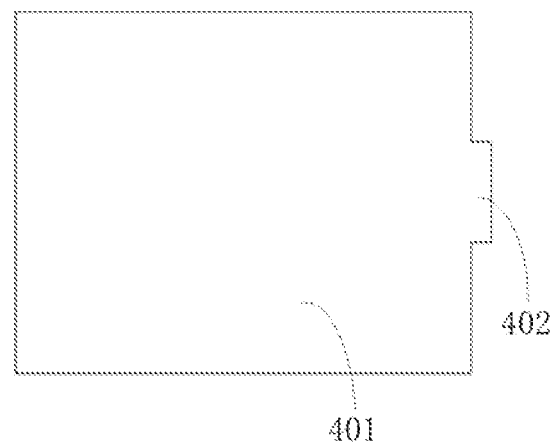
FIG. 3 is a top view of an optical functional layer provided by an embodiment of the present disclosure.
Figure 4:
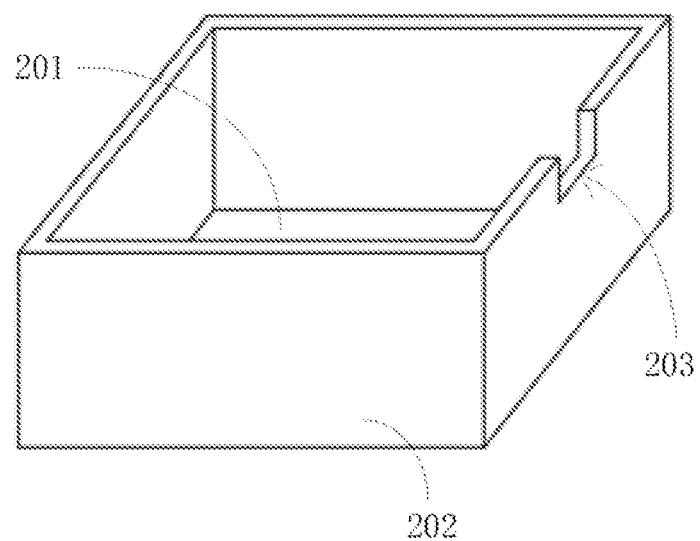
FIG. 4 is a schematic diagram of a back plate provided by an embodiment of the present disclosure.

An embodiment of the present disclosure first provides a backlight module. As shown in FIG. 2, the backlight module includes a light guide plate 10 and a light shielding member 50. The light guide plate 10 includes a light exiting surface and a bottom surface disposed opposite to each other, as well as a light incident surface and a light shielding surface both connected to the light exiting surface and the bottom surface. Furthermore, the light shielding member 50 is provided on the light shielding surface, and the light shielding member 50 includes a light reflecting layer and a light absorbing layer, and the light absorbing layer is located on one side of the light reflecting layer away from the light shielding surface.

In the backlight module provided by the present disclosure, the light shielding member 50 is provided on the light shielding surface of the light guide plate 10. The light shielding member 50 includes the light reflecting layer and the light absorbing layer. The light reflecting layer side (e.g., one side of the light shielding member) can reflect light rays back into the light guide plate 10 while the light absorbing layer side can absorb light rays escaping from the light guide plate 10, making the light rays without being reflected out of the backlight module to form a bright line, thereby solving the problem that the side-incident type light guide plate causes the display device to produce bright lines with a large viewing angle.

For example, the light guide plate 10 is formed using materials that do not absorb light, such as Polymethylmethacrylate (PMMA), MethylMethacrylate-styrenecopolymer (MS), synthetic resin, acryl, Polycarbonate (PC), Polyethylene terephthalate (PET), Polyolefines, or glass, so as to form a smooth plate by way of injection molding.

In one embodiment, the light guide plate 10 has a rectangular shape, and the light guide plate 10 includes an oppositely disposed light exiting surface and bottom surface, and four side surfaces connected with the light exiting surface and the bottom surface. Among these four side surfaces, at least one side surface is a light incident surface and the remaining side surfaces are light shielding surfaces. The light shielding member is located on at least one of the light shielding surfaces. When one side light source is provided, one of the side surfaces is the light incident surface and the other three side surfaces are the light shielding surfaces; when two side light sources are provided, two of the side surfaces are the light incident surface and the other two side surfaces are the light shielding surface; when three side light sources are provided, three of the side surfaces are the light incident surface, and the last side surface is the light shielding surface.

In addition, the light guide plate 10 may be polygonal, such as pentagonal, hexagonal, etc., and may also be round, oval, etc. The light guide plate 10 may also have an irregular shape, such as having a thickness gradually decreased from the light incident surface side to one side away from the light incident surface. Furthermore, the shape and size of the light shielding member 50 are consistent with the shape and size of the light shielding surface to ensure to form a shelter for all light shielding surfaces.

In one embodiment, the light shielding member 50 further includes a substrate, and the light reflecting layer and the light absorbing layer are disposed on two opposite sides of the substrate. The substrate may be a transparent substrate, such as flexible glass. The light reflecting layer and the light absorbing layer can be formed on a body of the light shielding member by spraying, depositing, pasting, etc.

In one embodiment, the backlight module further includes a light source. The light source is disposed on the light incident surface of the light guide plate 10 for emitting light rays from the light incident surface of the light guide plate 10 toward the light guide plate 10. The color of the light reflecting layer is the same as the color of light rays emitted by the light source. Since material usually does not absorb light rays with the same color as its own, adopting a light reflecting layer having the same color as light rays emitted by the light source can achieve good reflection of light rays leaked from the light shielding surface. Furthermore, the color of the light absorbing layer is different from the color of light rays emitted by the light source. Since the material usually absorbs light rays different from its own color, adopting a light absorbing layer having a color different from the color of light rays emitted by the light source can achieve good absorption of light rays leaked from light shielding surface. In addition, those skilled in the art should be aware that, since the light absorption effect of the non-white material is better, the light absorbing layer adopts a non-white material in addition to the color of light rays. For example, when light rays emitted by the light source is red, the color of the light reflecting layer is red, and the color of the light absorbing layer may be color other than red and white, which may be black, gray, or other colors.

In a further embodiment, the color of the light absorbing layer and the color of light rays emitted by the light source may be complementary colors. For example, when the color of light rays emitted by the light source is red, the color of the light absorbing layer is green; when the color of light rays emitted by the light source is green, the color of the light absorbing layer is red; when the color of light rays emitted by the light source is yellow, the color of the light absorbing layer is purple; and when the color of light rays emitted by the light source is blue, the color of the light absorbing layer is orange. The disclosure will not enumerate herein, and the person skilled in the art may select the light absorbing layer having a corresponding color according to the color of light rays emitted by the light source. Setting the color of the light absorbing layer and the color of light rays emitted by the light source to be complementary colors can enhance the absorption effect of the light absorbing layer on the leaked light rays, and improve the light shielding property of the light shielding member 50.

For example, the material of the light reflecting layer may be white glue or white optical ink, and the material of the light absorbing layer may be black glue or black optical ink. The composition of white glue includes resin silica gel and reflective powder, the resin silica gel is methyl silica gel or phenyl silica gel, and the reflective powder is oxide and the appearance thereof is white. The composition of black glue includes epoxy resin, amine latent curing agent, and inorganic filler. The disclosure does not make any limitation to the materials of the light reflecting layer and the light absorbing layer, and any material that can achieve the same technical effect belongs to the protection scope of the disclosure.

In one embodiment, the light shielding member 50 includes black-and-white glue. The black-and-white glue belongs to one kind of light-shielding tape. The black-and-white glue is made of a special compound black-and-white Polyethylene terephthalate (PET) substrate. It has light-shielding function and light-reflecting function. The white surface hardly absorbs light. The black surface has good light-shielding effect and do not have needle point light transmission. The white side of the black-and-white glue is provided with an adhesive layer, and the white side is bonded to the light shielding surface through the adhesive layer. The black-and-white glue has good processing performance during punching and rotating cutting processing, which can facilitate to get the black-and-white glue having a preset pattern by punching or cutting, so as to completely shade the light shielding surface, and glue overflow will not occur at the same time, which improves the reliability of the black-and-white glue.

In addition, the light reflecting layer, the substrate, and the light absorbing layer can be regarded as a set of light shielding layers. The light shielding member 50 can include a plurality of sets of light shielding layers. The light absorbing layer in each set of the plurality of sets of light shielding layers is located on one side of the light reflecting layer away from the light shielding surface. For example, the black-and-white glue is provided with a plurality of layers, which are formed by pasting multiple layers of black-and-white glue, so as to strengthen the structural strength of the black-and-white glue and prevent it from being damaged during use to cause light leakage. At the same time, by providing a plurality of light shielding layers, it can further prevent light rays from escaping from the light guide plate 10 to avoid it from being reflected out to form bright lines, which improves the reliability of the light shielding member 50.

As shown in FIG. 2, a light reflecting sheet 60 is provided on the bottom surface of the light guide plate 10. The light reflecting sheet 60 covers the bottom surface to reflect light rays emitted toward the bottom surface. Of course, the above-mentioned light shielding member 50 may also be provided on the bottom surface of the light guide plate 10.

As shown in FIG. 1, the backlight module further includes a back plate 20, an optical functional layer 40 and a middle frame 30. The back plate 20 includes a bottom plate 201 and a border 202 provided on the bottom plate 201. The light guide plate 10 is provided on the bottom plate 201, the border 202 surrounds the light guide plate 10, and a notch 203 is provided on one side of the border 202 away from the bottom plate 201. The optical functional layer 40 is provided on one side of the light guide plate 10 away from the bottom plate 201, and the optical functional layer 40 includes an optical functional layer body 401 and a protrusion portion 402. One end of the protrusion portion 402 is connected with edge of the optical functional layer body 401, and the other end of the protrusion portion 402 extends toward the position of the border 202 and is located in the notch 203.

As shown in FIG. 1, the middle frame 30 is sleeved on the side of the border 202 away from the bottom plate 201 and is used to fix the optical functional layer 40. The middle frame 30 includes a middle frame body 301 and an extension portion 302 extending from the middle frame body 301 toward a center part of the optical functional layer 40. The middle frame body 301 is sleeved on the border 202 and the extension portion 302 covers the optical functional layer 40. The extension portion 302 is formed with an opening to expose the optical functional layer 40. An orthographic projection of the extending portion 302 on the bottom plate 201 and an orthographic projection of the optical functional layer body 401 on the bottom plate 201 have an overlapping region, and the orthographic projection of the extending portion 302 on the bottom plate 201 and an orthographic projection of the protrusion portion 402 on the bottom plate 201 also have an overlapping region. In other words, the extension portion 302 only covers one or more edge parts of the optical functional layer 40.

The extension portion 302 and the middle frame body 301 can be connected together by integral molding, bonding, welding, or the like.

In the backlight module provided by the present disclosure, the notch 203 is disposed on the side of the border 202 away from the bottom plate 201. The optical functional layer 40 includes an optical functional layer body 401 and a protrusion portion 402 connected to an edge of the optical functional layer body 401, and the protrusion portion 402 is located in the notch 203. By providing the protrusion portion 402, the optical functional layer 40 can increase the area of the middle frame 30 covering the optical functional layer 40, thereby increasing the width of the middle frame 30 covering the edge portion of the optical functional layer 40, so that the optical functional layer 40 is prevented from getting out of an opening of the middle frame 30, and the reliability of the backlight module is improved.

In a further embodiment, the orthographic projection of the middle frame 30 on the bottom plate 201 completely covers the orthographic projection of the protrusion portion 402 on the bottom plate 201, that is, the orthographic projection of the extension portion 302 on the bottom plate 201 completely covers the orthographic projection of the protrusion portion 402 on the bottom plate 201. By making the extension portion 302 completely covering the protruding portion 402, the area of the middle frame 30 covering the optical functional layer 40 can be further increased, and the optical functional layer 40 can be further prevented from getting out of the opening of the middle frame 30, thereby further improving the reliability of the backlight module.

In one embodiment, the extension portion 302 appears as a closed ring shape, and the size and shape of an annular aperture in the ring-shaped extension portion 302 correspond to the size and shape of the optical functional layer 40 respectively. The extension portion 302 completely covers a circumference edge portion of the optical functional layer 40 to improve a fixing effect on the optical functional layer 40. In addition, the extension portion 302 may appear as a plurality of non-continuous strips. The plurality of strip-shaped extension portions 302 partially cover the circumference edge portion of the optical functional layer 40, so as to achieve the fixing effect on the optical functional layer.

In one embodiment, a plurality of protrusion portions 402 and a plurality of notches 203 may be provided, and each of the notches 203 corresponds to one protrusion portion 402 respectively. Providing the plurality of protrusions portion 402 respectively cooperated with plurality of notches 203 can further increase the area of the middle frame 30 covering the optical functional layer 40, and further prevent the optical functional layer 40 from getting out of the opening of the middle frame 30, thereby further improving the reliability of the backlight module.

In a further embodiment, the plurality of protrusion portions 402 are evenly distributed in the circumferential direction of the optical functional layer body 401, and the plurality of notches 203 on the border 202 are also evenly distributed in the circumferential direction of the optical functional layer body 401. For example, when two protrusion portions 402 and two notches 203 are disposed, the protrusion portions 402 may be symmetrically distributed on the optical functional layer body 401, and the notches 203 may be symmetrically distributed on the border 202. When four protrusions 402 and four notches 203 are disposed, since the optical functional layer 40 is generally rectangular, a protrusion portion 402 can be formed at the center position of each of the four sides of the optical functional layer body 401 respectively, and each of the notches 203 of the border 202 also appear as a rectangle correspondingly. A notch 203 is formed at the center part of each of side walls of the border 202, respectively, so that each of the protrusion portions 402 are located in a corresponding notch 203 by way of one-to-one correspondence.

In addition, the plurality of protrusion portions 402 can also be freely distributed on the optical functional layer body 401, as long as the number and position distribution of the notches 203 and the number and position distribution of the protrusion portions 402 are consistent. Of course, the number of notches 203 may also be greater than the number of protrusion portions 402, which is not limited in this disclosure.

In one embodiment, the length of the protrusion portion 402 in the extending direction thereof is greater than 0.5 mm, so that the width of an overlapping region where the middle frame 30 overlaps with the protrusion portion of the optical functional layer 40 is in the extending direction of the protrusion portion 402 may be greater than 0.9 mm, thereby increasing the area of the middle frame 30 covering the optical functional layer 40, thereby further preventing the optical functional layer 40 from getting out of the opening of the middle frame 30, and further improving the reliability of the backlight module. Of course, the length of the protrusion portion 402 may also less than 0.5 mm. This is not limited in the present disclosure.

In one embodiment, the optical functional layer 40 may include a soft lens, a light-enhancing film, and a polarizer, which are arranged sequentially layer by layer. Those skilled in the art may also arrange other optical layers as long as they have the above-mentioned one or more protrusion portions. This is not limited in the present disclosure.

An embodiment of the present disclosure also provides a display module including the above-mentioned backlight module and a display component, and the display component is provided on the backlight module. For the beneficial effects of the display module provided by the present disclosure, reference may be made to the foregoing description of the beneficial effects of the backlight module, which will not be repeated here.

Figure 5:
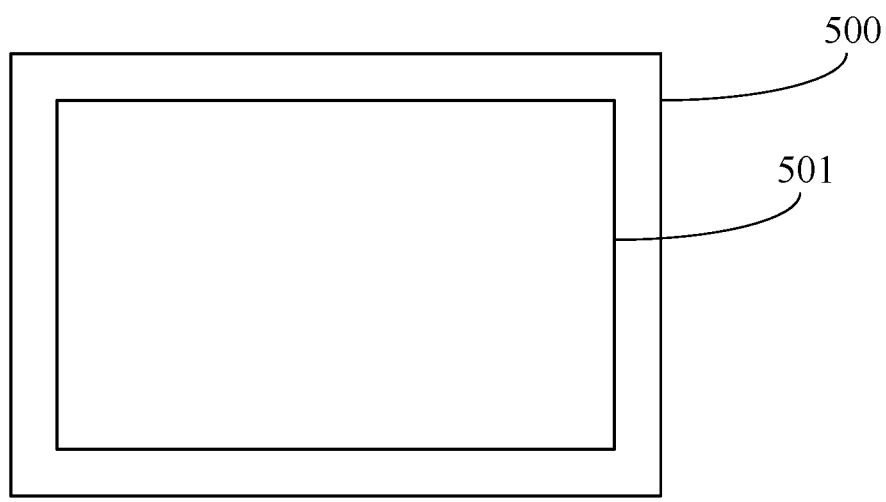
FIG. 5 is a schematic diagram of a display device provided by an embodiment of the present disclosure.

An embodiment of the present disclosure also provides a display device. FIG. 5 is a schematic diagram of a display device provided by an embodiment of the present disclosure. As shown in FIG. 5, a display device 500 includes a display module 501 as mentioned above. For the beneficial effects of the display device provided by the present disclosure, reference may be made to the foregoing description of the beneficial effects of the display module, which will not be repeated here.

Those skilled in the art will readily contemplate other embodiments of the present disclosure after considering the specification and practicing the disclosure. The present disclosure is intended to cover any variations, uses, or adaptive changes of the present disclosure. These variations, uses, or adaptive changes follow the general principles of the present disclosure and include the common general knowledge or conventional technical means in this art which is not described herein. The specification and examples should be considered as exemplary only, and the true scope and spirit of the disclosure should be defined by the appended claims.

What is claimed is:

1. A backlight module, comprising:
   a light guide plate having a light exiting surface and a bottom surface that are oppositely arranged, and a light incident surface and a light shielding surface both connected with the light exiting surface and the bottom surface; and a light shielding member disposed on the light shielding surface, the light-shielding member having a light reflecting layer and a light absorbing layer, wherein the light-absorbing layer is located on a side of the light reflecting layer away from the light shielding surface, the light shielding member further comprises a substrate, and the light reflecting layer and the light absorbing layer are disposed on opposite sides of the substrate.

2. The backlight module according to claim 1, further comprising:

a light source disposed on the light incident surface of the light guide plate;

wherein a color of the light reflecting layer is the same as a color of light rays emitted by the light source, and a color of the light absorbing layer is different from the color of light rays emitted by the light source.

3. The backlight module according to claim 2, wherein the color of the light absorbing layer and the color of light rays emitted by the light source are complementary colors.

4. The backlight module according to claim 1, wherein the light reflecting layer is formed of a white, light reflecting material, and the light absorbing layer is formed of a black, light absorbing material.

5. The backlight module according to claim 4, wherein a material of the light reflecting layer comprises white glue or white optical ink, and a material of the light absorbing layer comprises black glue or black optical ink.

6. The backlight module according to claim 1, wherein:

the light guide plate appears as a rectangular shape, the light guide plate having the light exiting surface and the bottom surface disposed opposite to each other, and four side surfaces being connected to the light exiting surface and the bottom surface; and at least one of the side surfaces is the light incident surface, and remaining side surfaces are the light shielding surfaces, and the light shielding member is located on at least one of the side surfaces.

7. The backlight module according to claim 1, further comprising:

a back plate having a bottom plate and a border provided on the bottom plate, wherein the light guide plate is disposed on the bottom plate, the border surrounds the light guide plate, and a notch is disposed on a side of the border away from the bottom plate;

an optical functional layer disposed on a side of the light guide plate away from the bottom plate, the optical functional layer having an optical functional layer body and a protrusion portion, wherein one end of the protrusion portion is connected with edge of the optical functional layer body, and the other end of the protrusion portion extends toward a position of the border and is located in the notch; and a middle frame disposed on the side of the border away from the bottom plate to fix the optical functional layer.

8. The backlight module according to claim 7, wherein an orthographic projection of the optical functional layer body on the bottom plate and an orthographic projection of the middle frame on the bottom plate have an overlapping region, and an orthographic projection of the protrusion portion on the bottom plate and the orthographic projection of the middle frame on the bottom plate have an overlapping region.

9. The backlight module according to claim 8, wherein the orthographic projection of the middle frame on the bottom plate completely covers the orthographic projection of the protrusion portion on the bottom plate.

10. The backlight module according to claim 7, wherein a length of the protrusion portion in an extending direction thereof is greater than 0.5 mm.

11. The backlight module according to claim 7, wherein a plurality of the protrusion portions and a plurality of the notches are provided, and each of the notches corresponds to a protrusion portion respectively.

12. The backlight module according to claim 11, wherein the plurality of protrusion portions are distributed in the circumferential direction of the optical functional layer body.

13. A display module, comprising:

a backlight module; and a display panel disposed at a light exiting side of the backlight module, wherein the backlight module comprises:

a light guide plate having a light exiting surface and a bottom surface that are oppositely arranged, and a light incident surface and a light shielding surface both connected with the light exiting surface and the bottom surface; and a light shielding member disposed on the light shielding surface, the light-shielding member having a light reflecting layer and a light absorbing layer, the light-absorbing layer being located on a side of the light reflecting layer away from the light shielding surface;

wherein the light shielding member further comprises a substrate, and the light reflecting layer and the light absorbing layer are disposed on opposite sides of the substrate.

14. The display module according to claim 13, wherein the backlight module further comprises a light source disposed on the light incident surface of the light guide plate, wherein a color of the light reflecting layer is the same as a color of light rays emitted by the light source and a color of the light absorbing layer is different from the color of light rays emitted by the light source.

15. The display module according to claim 13, wherein the light reflecting layer is formed of a white, light reflecting material, and the light absorbing layer is formed of a black, light absorbing material.

16. The display module according to claim 13, wherein:

the light guide plate appears as a rectangular shape;

the light guide plate has the light exiting surface and the bottom surface disposed opposite to each other, and four side surfaces connected to the light exiting surface and the bottom surface;

at least one of the side surfaces is the light incident surface;

remaining side surfaces are the light shielding surfaces; and the light shielding member is located on at least one of the side surfaces.

17. The display module according to claim 13, wherein the backlight module further comprises:

a back plate having a bottom plate and a border provided on the bottom plate, the light guide plate is disposed on the bottom plate, the border surrounds the light guide plate, and a notch is disposed on a side of the border away from the bottom plate;

an optical functional layer disposed on a side of the light guide plate away from the bottom plate, the optical functional layer having an optical functional layer body and a protrusion portion, one end of the protrusion portion is connected with edge of the optical functional layer body, the other end of the protrusion portion extends toward a position of the border and is located in the notch; and a middle frame disposed on the side of the border away from the bottom plate to fix the optical functional layer.

18. A display device, comprising:

a display module comprising a backlight module and a display panel disposed at a light exiting side of the backlight module, wherein the backlight module comprises:

a light guide plate having a light exiting surface and a bottom surface that are oppositely arranged, and a light incident surface and a light shielding surface both connected with the light exiting surface and the bottom surface; and a light shielding member disposed on the light shielding surface, the light-shielding member having a light reflecting layer and a light absorbing layer, the light-absorbing layer being located on a side of the light reflecting layer away from the light shielding surface, wherein the light shielding member further comprises a substrate, and the light reflecting layer and the light absorbing layer are disposed on opposite sides of the substrate.

* * * * *